US009542061B2

(12) United States Patent
Baalu et al.

(10) Patent No.: US 9,542,061 B2
(45) Date of Patent: Jan. 10, 2017

(54) GRAPHICAL USER INTERFACE SIZING AND ARRANGEMENT SYSTEM

(71) Applicant: Harman International Industries, Incorporated, Stamford, CT (US)

(72) Inventors: Arvin Baalu, Bangalore (IN); Manu Malhotra, Bangalore (IN); Trisha Mishra, Bangalore (IN); Aajjay H. Chavaan, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 280 days.

(21) Appl. No.: 13/828,635

(22) Filed: Mar. 14, 2013

(65) Prior Publication Data

US 2014/0082515 A1    Mar. 20, 2014

(30) Foreign Application Priority Data

Sep. 17, 2012  (IN) ............................ 3853/CHE/2012

(51) Int. Cl.
*G06F 3/048* (2013.01)
*G06F 3/0481* (2013.01)

(52) U.S. Cl.
CPC ............. *G06F 3/048* (2013.01); *G06F 3/0481* (2013.01); *G06F 3/04817* (2013.01)

(58) Field of Classification Search
CPC  G06F 3/04842; G06F 3/0482; G06F 3/04817; G06F 3/0484; G06F 3/04847
USPC ................................ 715/707, 750, 762–765
See application file for complete search history.

(56) References Cited

U.S. PATENT DOCUMENTS

| | | | |
|---|---|---|---|
| 5,812,128 A * | 9/1998 | Sterling, IV | G06F 3/04817 715/762 |
| 7,263,661 B2 * | 8/2007 | Chavers et al. | 715/744 |
| 8,175,279 B2 * | 5/2012 | Tiwari et al. | 381/1 |
| 8,245,143 B2 * | 8/2012 | Yach et al. | 715/744 |
| 8,831,824 B2 * | 9/2014 | Moinzadeh | B60R 25/00 340/438 |
| 8,910,067 B1 * | 12/2014 | Anderson | G06F 3/04817 715/744 |
| 2002/0063735 A1 * | 5/2002 | Tamir et al. | 345/745 |
| 2006/0095864 A1 * | 5/2006 | Mock | G06F 1/3203 715/810 |

(Continued)

FOREIGN PATENT DOCUMENTS

| EP | 2400381 A2 | 12/2011 |
|---|---|---|
| WO | WO 99/66394 | 12/1999 |
| WO | 2012063261 A2 | 5/2012 |

OTHER PUBLICATIONS

ISA European Patent Office, International Search Report of PCT/US2013/059184, Feb. 12, 2013, WIPO, 3 pages.

*Primary Examiner* — Tadeese Hailu
(74) *Attorney, Agent, or Firm* — Alleman Hall McCoy Russell & Tuttle LLP (57) ABSTRACT

A system for adjusting a graphical element, such as a widget, a menu, and/or an icon of a graphical user interface (GUI) associated with one or more user actions, applications, and/or electronic media. The adjusting of the graphical element may be based at least partially on data regarding frequency, duration, and/or time of the one or more actions and/or use of the applications or the electronic media by a user. Additionally or alternatively, the adjusting of the graphical element may be based on a routine of the user.

20 Claims, 7 Drawing Sheets

(56) References Cited

U.S. PATENT DOCUMENTS

| | | | |
|---|---|---|---|
| 2007/0174782 A1* | 7/2007 | Russo | G06F 3/04817 |
| | | | 715/781 |
| 2010/0179991 A1* | 7/2010 | Lorch | H04M 1/7253 |
| | | | 709/206 |
| 2012/0140255 A1 | 6/2012 | Tanaka | |
| 2013/0139109 A1* | 5/2013 | Kim | G06F 3/04883 |
| | | | 715/835 |

* cited by examiner

Call Logs > Frequently Called

| Jane Doe | ☎ 7 |
| John Doe | ☎ 5 |
| Tom | ☎ 3 |

Frequencies

AHA Radio 98.3 FM : Radio

Mirchi

91 FM : Radio City

Radio > AHA

GRAPHICAL USER INTERFACE SIZING AND ARRANGEMENT SYSTEM

BACKGROUND OF THE INVENTION

1. Priority Claim

This application claims the benefit of priority from Indian Patent Application No. 3853/CHE/2012, filed Sep. 17, 2012, which is incorporated by reference.

2. Technical Field

The present disclosure relates to graphical systems for sizing and arranging one or more elements of a graphical user interface (GUI), such as menus, icons, and/or widgets.

3. Related Art

A GUI is a type of user interface that allows users to interact with electronic devices using images, such as pointers, menus, icons, and/or widgets rather than text commands. Elements of a GUI may represent actions, controls, and information available to a user. Besides images, elements of a GUI may also include text. GUIs can be used with desktop and laptop computers, hand-held devices such as smartphones and tablet computers, portable media players and gaming devices, household appliances, office equipment, set-top boxes, and automotive electronics such as head units and navigation systems.

SUMMARY

A graphic system may perform a method for adjusting a graphical element associated with a user action, an application, or electronic media. The method may include receiving and storing information regarding a frequency, a duration, or a time in which a user performs the action or uses the application or the electronic media. The stored information may also include routines of the user. The method may also include changing configuration information (such as changing size) of the graphical element based at least partially on the stored information.

Further, the method may include transmitting the graphical element and the configuration information to a user interface, such as a graphical user interface (GUI). In displaying the graphical element, the graphical element may reside in a cell of a predefined area of coordinates, such as a grid, of the GUI. Further, the method may include adjusting the graphical element to substantially fill one or more cells of the predefined area of coordinates of the GUI according to the stored information.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system, such as a graphical system (GS), may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

It is to be understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

In one example of a graphic system (GS), the system may perform, via aspects of an electronic device, a method for adjusting, such as sizing and moving, a graphical element, such as a widget, a menu, and/or an icon of a graphical user interface (GUI) associated with one or more user actions, applications, and/or electronic media. The method may include receiving and/or storing user input information, such as information regarding a frequency, a duration, or a time in which the user performs the action or uses the application or electronic media. The user input information may also include routines of the user, such as habits that include use of a specific application and/or media during a certain time of a day and/or a certain day of a week, for example. The method may also include changing configuration information (such as changing size) of the graphical element, where the changing of the configuration information may be based at least partially on the stored user input information. The method may also include transmitting the graphical element and/or the configuration information to a user interface, such as a graphical user interface (GUI). In displaying the graphical element, the graphical element may reside in a cell of a predefined area of coordinates, such as a grid, of the GUI. Further, the method may also include adjusting the graphical element to substantially fill one or more cells of the predefined area of coordinates of the GUI according to the user input information and/or the configuration information.

In one example, changing the configuration information may be based according to a weight function. For example, the size of a graphical element can be changed according to the following weight function: $S(f, t, r)=(S(f)\times F)+(S(t)\times T)+(S(r)\times R)$; where $S(f, t, r)$ may be a total size score; where $S(f)$, $S(t)$, and $S(r)$ may be respective size scores corresponding to a frequency, a duration, and a routine in which the user performs the action or uses the application or the electronic media; and where F, T, and R may be respective weights, such as respective user configurable weights. In examples where the graphical element resides in one or more cells, a size score may reflect the number of cells containing the graphical element. For example, a size score of four may correspond to the graphical element occupying four cells of a predefined area of coordinates.

Figure 1:
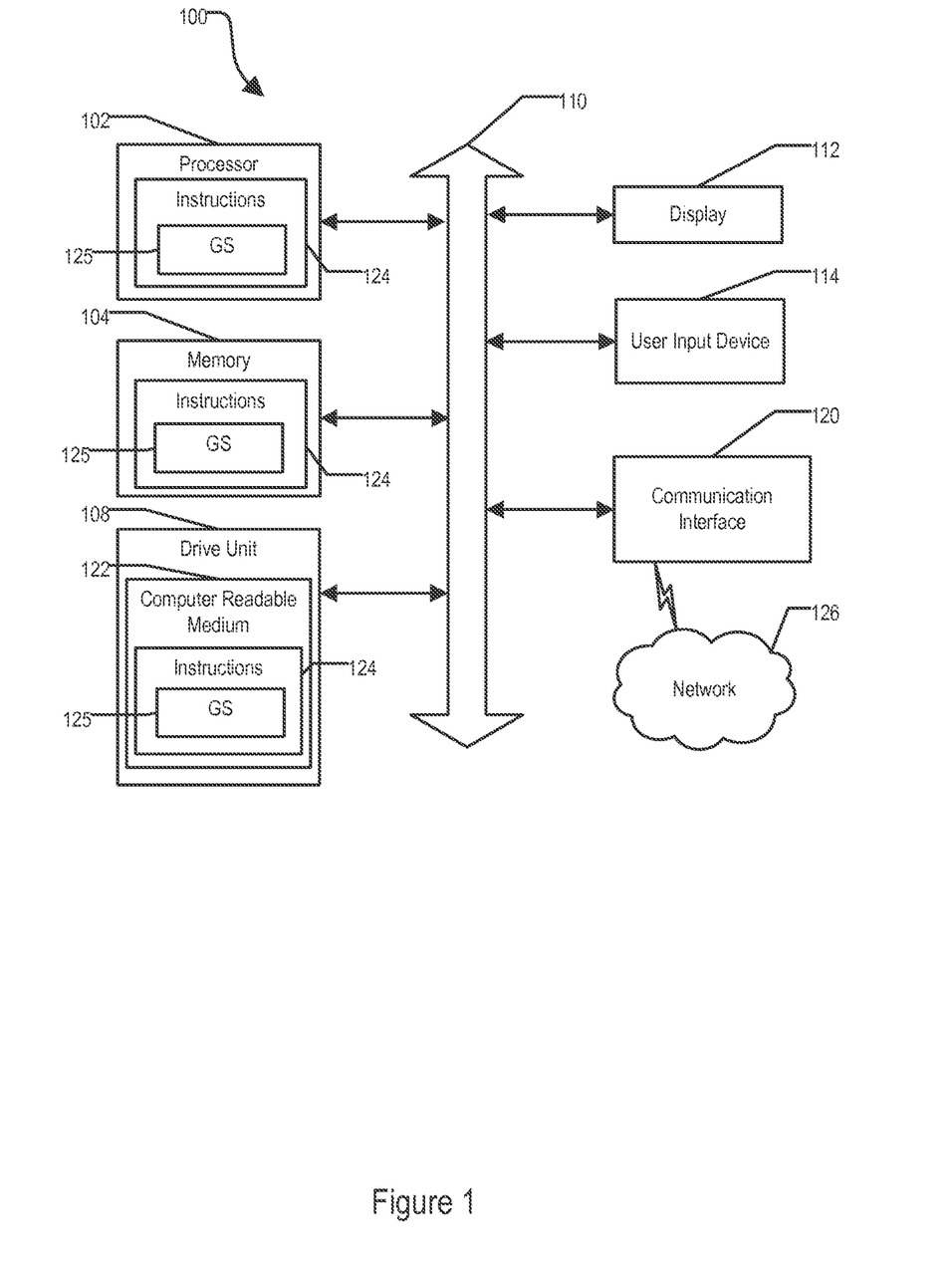
FIG. 1 is a block diagram of an example electronic device that may include one or more aspects of an example GS.

FIG. 1 is a block diagram of an example electronic device 100 that may include one or more aspects of an example GS. The electronic device 100 may include a set of instructions that can be executed to cause the electronic device 100 to perform any one or more of the methods or computer based functions disclosed, such as arranging and/or sizing a menu, widget, and/or icon of a GUI according to previous user interaction with the GUI. The electronic device 100 may operate as a standalone device or may be connected, such as using a network, to other computer systems or peripheral devices.

In a networked deployment, the electronic device 100 may operate in the capacity of a server or as a client user computer in a server-client user network environment, as a peer computer system in a peer-to-peer (or distributed) network environment, or in various other ways. The electronic device 100 can also be implemented as or incorporated into various electronic devices, such as desktop and laptop computers, hand-held devices such as smartphones and tablet computers, portable media devices such as recording, playing, and gaming devices, household appliances, office equipment, set-top boxes, automotive electronics such as head units and navigation systems, or any other machine capable of executing a set of instructions (sequential or otherwise) that specify actions to be taken by that machine. The electronic device 100 may be implemented using electronic devices that provide voice, audio, video and/or data communication. While a single electronic device 100 is illustrated, the term "device" may include any collection of devices or sub-devices that individually or jointly execute a set, or multiple sets, of instructions to perform one or more electronic functions. The one or more functions may include arranging and/or sizing a menu, widget and/or icon of a GUI according to previous user interaction with the GUI or the electronic device including the GUI.

A menu may include a menu bar, a menu within a menu bar, a context menu, and/or menu extras. A widget may include a window, a text cell, hyperlink text, a drop-down list, a list cell, a check cell, various types of buttons such as a push button or radio button, the like, or any combination thereof. An icon may include a shortcut or an executable icon, for example.

The electronic device 100 may include a processor 102, such as a central processing unit (CPU), a graphics processing unit (GPU), or both. The processor 102 may be a component in a variety of systems. For example, the processor 102 may be part of a standard personal computer or a workstation. The processor 102 may be one or more general processors, digital signal processors, application specific integrated circuits, field programmable gate arrays, servers, networks, digital circuits, analog circuits, combinations thereof, or other now known or later developed devices for analyzing and processing data. The processor 102 may implement a software program, such as code generated manually or programmed.

The term "module" may be defined to include a plurality of executable modules. The modules may include software, hardware, firmware, or some combination thereof executable by a processor, such as processor 102. Software modules may include instructions stored in memory, such as memory 104, or another memory device, that may be executable by the processor 102 or other processor. Hardware modules may include various devices, components, circuits, gates, circuit boards, and the like that are executable, directed, or controlled for performance by the processor 102.

The electronic device 100 may include memory, such as a memory 104 that can communicate via a bus 110. The memory 104 may be a main memory, a static memory, or a dynamic memory. The memory 104 may include any non-transitory memory device. The memory 104 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software is stored. The software may be electronically stored as an image or in another format (such as through an optical scan), then compiled, or interpreted or otherwise processed.

In one example, the memory 104 includes a cache or random access memory for the processor 102. In alternative examples, the memory 104 may be separate from the processor 102, such as a cache memory of a processor, the system memory, or other memory. The memory 104 may be an external storage device or database for storing data. Examples include a hard drive, compact disc ("CD"), digital video disc ("DVD"), memory card, memory stick, floppy disc, universal serial bus ("USB") memory device, or any other device operative to store data. For example, the electronic device 100 may also include a disk or optical drive unit 108. The drive unit 108 may include a computer-readable medium 122 in which one or more sets of software or instructions, such as the instructions 124, can be embedded. Not depicted in FIG. 1, the processor 102 and the memory 104 may also include a computer-readable medium with instructions or software.

The memory 104 is operable to store instructions executable by the processor 102. The functions, acts or tasks illustrated in the figures or described may be performed by the programmed processor 102 executing the instructions stored in the memory 104. The functions, acts or tasks may be independent of the particular type of instructions set, storage media, processor or processing strategy and may be performed by software, hardware, integrated circuits, firmware, microcode and the like, operating alone or in combination. Likewise, processing strategies may include multi-processing, multitasking, parallel processing and the like.

The instructions 124 may embody one or more of the methods or logic described herein, including aspects or modules of the electronic device 100 and/or an example graphical system 125, such as the GS described herein. The instructions 124 may reside completely, or partially, within the memory 104 or within the processor 102 during execution by the electronic device 100.

The electronic device 100 may include computer-readable medium that includes the instructions 124 or receives and executes the instructions 124 responsive to a propagated signal so that a device connected to a network 126 can communicate voice, video, audio, images or any other data over the network 126. The instructions 124 may be transmitted or received over the network 126 via a communication port or interface 120, or using a bus 110. The communication port or interface 120 may be a part of the processor 102 or may be a separate component. The communication port or interface 120 may be created in software or may be a physical connection in hardware. The communication port or interface 120 may be configured to connect with the network 126, external media, a display unit 112, or any other components in the electronic device 100, or combinations thereof. The connection with the network 126 may be a physical connection, such as a wired Ethernet connection or may be established wirelessly. The additional connections with other components of the electronic device 100 may be physical connections or may be established wirelessly. The network 126 may alternatively be directly connected to the bus 110.

The network 126 may include wired networks, wireless networks, Ethernet AVB networks, a CAN bus, a MOST bus, or combinations thereof. The wireless network may be a cellular telephone network, an 802.11, 802.16, 802.20, 802.1Q or WiMax network. Further, the network 126 may be a public network, such as the Internet, a private network, such as an intranet, or combinations thereof, and may utilize a variety of networking protocols now available or later developed including TCP/IP based networking protocols. One or more components of the electronic device 100 may communicate with each other by or through the network 126.

The electronic device 100 may also include a display unit 112, such as a liquid crystal display (LCD), an organic light emitting diode (OLED), a flat panel display, a solid state display, a cathode ray tube (CRT), a projector, a printer or other now known or later developed display device for outputting determined information. The display unit 112 may act as an interface for the user to see the functioning of the processor 102, or specifically as an interface with the software stored in the memory 104 or in the drive unit 108.

The electronic device 100 may also include an input device 114 configured to allow a user to interact with any of the components of the electronic device. The input device 114 may be a plurality pad, a keyboard, a cursor control device, such as a mouse, or a joystick. Also, the input device 114 may be a remote control, touchscreen display (which may be a combination of the display unit 112 and the input device 114), or any other device operative to interact with the electronic device 100, such as any device operative to act as an interface between a user and the electronic device.

Figure 2:
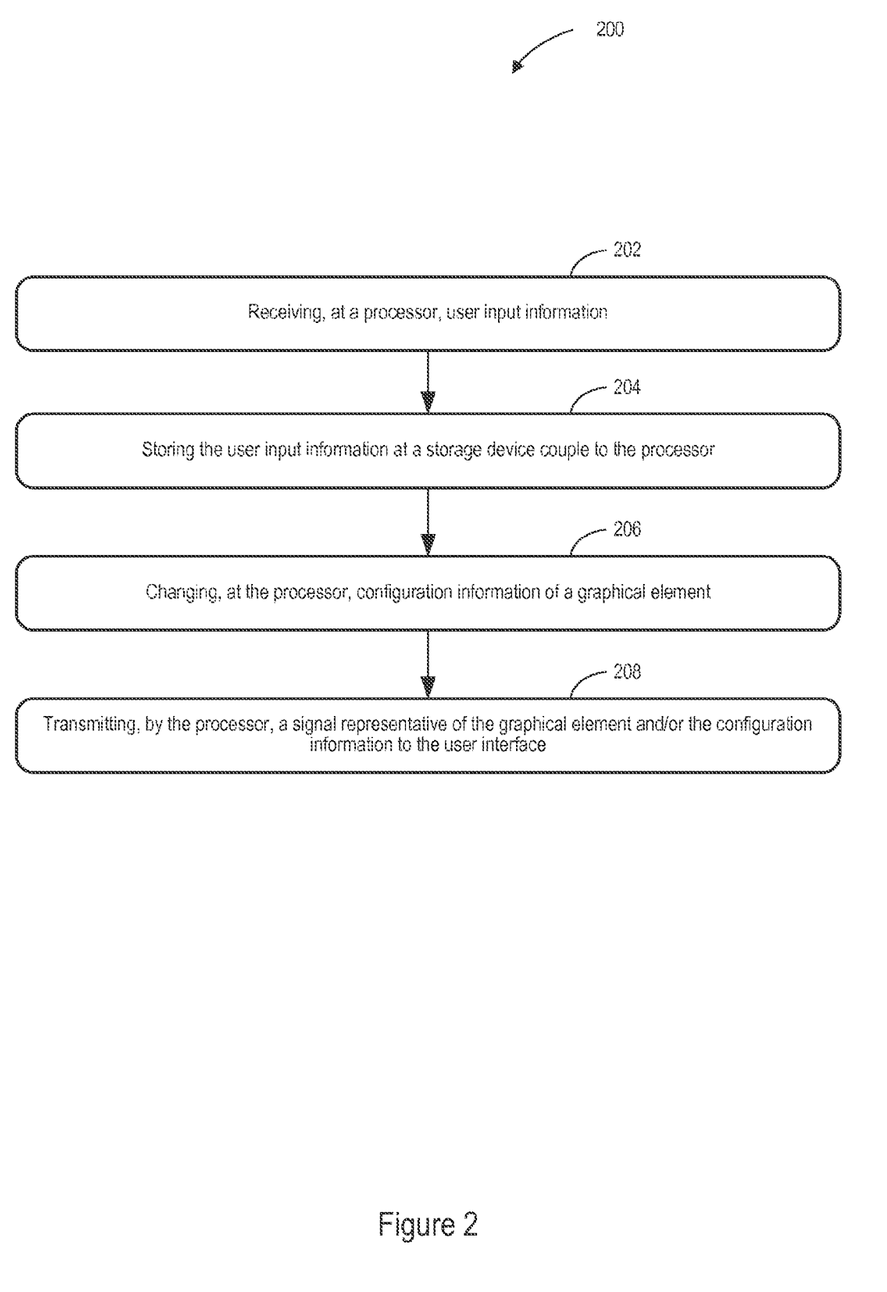
FIG. 2 illustrates an operational flow diagram that can be performed by one or more aspects of an example GS, such as the one or more aspects of the electronic device of FIG. 1.

FIG. 2 illustrates an operational flow diagram that can be performed by one or more aspects of an example GS, such as the one or more aspects of the electronic device of FIG. 1.

In one example of the GS, a processor (such as the processor 102) can execute processing device readable instructions encoded in memory (such as the memory 104). In such an example, the instructions encoded in memory may include a software aspect of the APAS, such as the APAS module 125. An example operation 200 of the GS may be initiated by an event, such as a user activating an electronic device hosting the processor and interacting with the electronic device over a determined threshold. The user may interact with the electronic device via input that may include voice, touch, retinal movement, gestures, buttons, sliders, and/or the like.

At 202, the example operation 200 may include receiving, at a processor, user input information. At 204, the example operation 200 may include storing the user input information at a storage device couple to the processor. At 206, the example operation 200 may include changing, at the processor, configuration information of the graphical element. The changing of the configuration information of the graphical element may be based at least partially on the stored user input information. With respect to the user input information, this information may include data regarding a frequency, a duration (such as an average duration), and/or a time of the one or more actions, applications, and/or access of the electronic media, so that the media can be used or consumed. Additionally or alternatively, the user input information may include routines of the user. Also, an example operation of the GS may include adjusting, at the processor, the graphical element to substantially fill one or more cells of the predefined area of coordinates according to the user input information.

At 208, the example operation 200 may include transmitting, by the processor, a signal representative of the graphical element and/or the configuration information to the user interface. In displaying the graphical element, the graphical element may reside in a cell of a predefined area of coordinates, such as a grid, of the user interface. The cell may be a square, a rectangle, a diamond, a triangle, or a circle.

In another example of the graphic system, the system may include a processor and a memory device that includes processor executable instructions operable to perform aspects of the methods described herein. Such methods may include receiving and storing user input, and changing a size of a graphical element associated with an action. User input may include information from voice, touch, retinal movement, gestures, buttons, sliders, and/or the like. The change of the size of the graphical element may be based at least partially on the stored user input. In this example, the stored user input may include data regarding frequency, duration, and/or recentness of the action. The stored user input may also include data regarding times and days of the action. Also, the method may include transmitting a signal representative of the graphical element to a display device. The display device may include a touchscreen, and the received user input may include one or more touches to the touchscreen. Also in this example, the graphical element may include one or more shortcut icons, executable icons or widgets. Further, in this example and others, the system may include one or more desktop and laptop computers, handheld devices such as smartphones and tablet computers, portable media players and gaming devices, household appliances, office equipment, set-top boxes, and automotive electronics such as head units and navigation systems. One or more of these devices may include one or more instances of the display device. The graphical element may reside in a cell of a predefined area of coordinates of the display device, and the cell may be a square, rectangle, diamond, triangle, or circle. In addition or alternatively, the processor executable instructions are further operable to adjust the graphical element to substantially fill one or more cells of a predefined area of coordinates, such as a grid, of the display device.

In another example of the graphic system, the system may include an electronic device that includes processor executable instructions operable to perform aspects of the methods described herein via the processor and other aspects of the electronic device. For example, the electronic device may include a user input device, such as a microphone, a keypad, a button, a touchscreen, or an electro-optical sensor, operable to receive user input along with the processor and a memory device. The memory device includes processor executable instructions operable to perform methods described herein. Such methods may also include operations to: store the user input; and change a size of a graphical element associated with an action, an application, and/or electronic media, based at least partially on the stored user input. In such operations, the stored user input may include data regarding frequency, duration, and/or recentness of the action or access of the application or the electronic media. The stored user input may also include data regarding times and days of the action or access of the application or the electronic media, such as a timestamp. Also, the electronic device may include a display device operable to display the graphical element on a home screen. The user input device and display device may include a touchscreen, and the received user input may include one or more touches to the touchscreen. The graphical element may include one or more menus, shortcut icons, executable icons, and/or widgets; and the graphical element resides in a cell of a predefined area of coordinates, such as a grid, of the home screen. Further, the processor executable instructions of the electronic device may be further operable to adjust the graphical element to substantially fill one or more cells of the predefined area of coordinates of the home screen.

With respect to FIGS. 3-7, illustrated are screenshot representations of an example display, such as display unit 112. As mentioned, the display unit 112 may be combined with the input device 114 to enable a user input device, such as a microphone, a keypad, a button, a touchscreen, or an electro-optical sensor.

Figure 3:
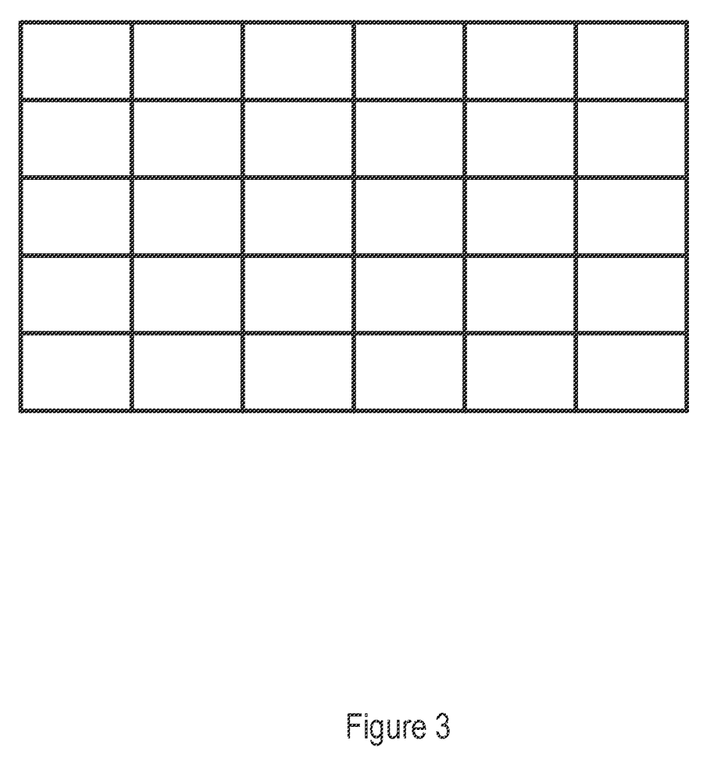
FIG. 3 illustrates an example display, such as a display of the electronic device of FIG. 1, that may display one or more aspects of an example GS.

In the example of FIG. 3, depicted is a grid with thirty cells (a 6×5 grid). One or more of the thirty cells represent a possible position and approximate size of a graphical element, such as an icon. Although depicted is the 6×5 grid (which may be a 6×5 cm grid, where each cell is a square centimeter, for example), a grid and its cells may take on any dimensions and shape. The dimensions and shape may depend on size, shape, and/or resolution of a display displaying the cells.

In one example of the display, the display may be a touchscreen with areas selectable on a grid, such as the selectable cells of the 6×5 grid of FIG. 3. Each selectable cell may contain a graphic (such as an icon) associated with frequently and/or recently operated and/or accessed operations, applications, and/or electronic media. With usage of one or more of the frequently and/or recently operated and/or accessed operations, applications, and/or electronic media, the associated graphic may change, such as enlarge or change in color. For example, the associated graphic may first enlarge by occupying two selectable cells. Then with even more relative frequent and/or recent use, the graphic may enlarge by occupying three or four selectable cells, and so on. A number of cells containing to a graphic may depend on the overall size of the display. A larger display may provide for a graphic to grow to a larger extent with greater variety in sizes, for example. Also, resolution of the display is another factor that may contribute to the degree and amount in which a graphic can grow. Further, a grid may have various themes. For example, the grid may be made up of selectable squares, rectangles, diamonds, circles, triangles, and any other shapes; and the shapes of these cells within a grid may not be the same size.

Figure 4:
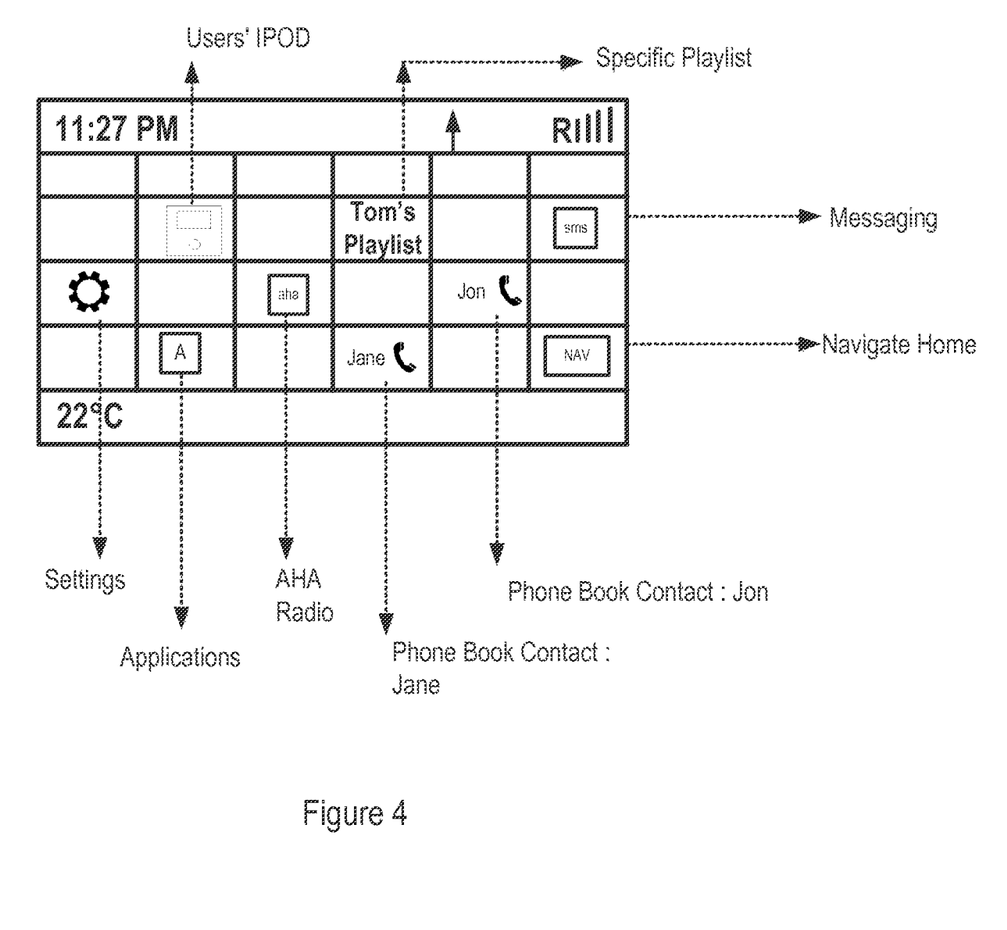
FIG. 4 illustrates the display of FIG. 3, where the display may represent a system home screen example prior to a user interacting with the system home screen or after refreshing the system home screen.

In FIG. 4, depicted is an example system home screen of an electronic device, such as the electronic device 100. As depicted, for example, an aspect of the GS may arrange icons, such as shortcut and executable icons, within every other cell, diagonally. Also depicted, an aspect of the GS may size the icons, so that the icons substantially fill in the cells, respectively. As depicted, each cell containing an icon is surrounded to its immediate left, right, top, or bottom by a border of the display or a cell without an icon. This arrangement allows the icons to increase in size, vertically and/or horizontally by occupying more than one adjacent cell.

The home screen example depicted in FIG. 4 may include a sizing and arrangement of the aforementioned icons prior to a user interacting with the system home screen or after refreshing the system home screen. Also, the arrangement and sizing may be coincidental in that the user has interacted equally with the icons and/or respective media and/or applications related to the icons, according to a logic procedure of the GS that determines the sizing and arrangement of graphical elements.

Figure 5:
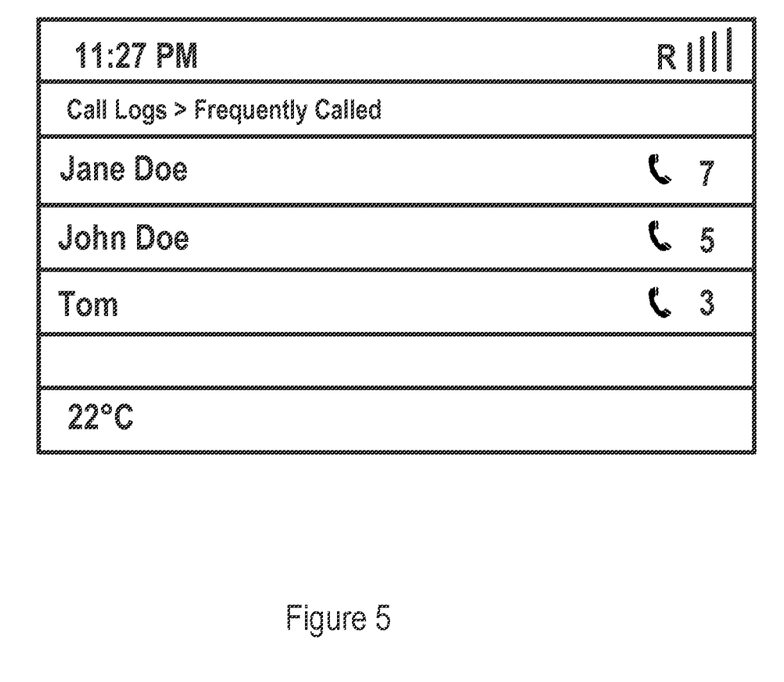
FIG. 5 illustrates the display of FIG. 3, where the display may represent an application home screen example, such as a home screen of a "contacts" application, in which one or more aspects of the GS may activate subsequent to a user selecting a respective icon and/or widget operable to initiate execution of the "contacts" application.

FIG. 5 illustrates an example screen of the display of FIG. 3, where the screen may represent an application home screen, such as a home screen of a "contacts" application, which one or more aspects of the GS may activate subsequent to a user selecting a respective icon and/or widget operable to initiate execution of the "contacts" application. Also, depicted is a call log of frequently called contacts. As illustrated in FIG. 1, the contact "Jane" has been called the most within a predetermined period of time. Depending on user settings, whether default settings or configured by the user, a shortcut icon for contacting "Jane" may be enlarged on the system home screen or the respective application home screen due to "Jane" being the most frequently called contact. Also, an icon representing a shortcut to contacting a contact may increase and/or decrease in size with respect to frequency, duration, and/or recentness in which the user contacts the contact, relative to the frequency, duration, and/or recentness in which the user contacts other contacts. This functionality may also occur according to a routine of the user and/or a routine of a person associated with the user.

Figure 6:
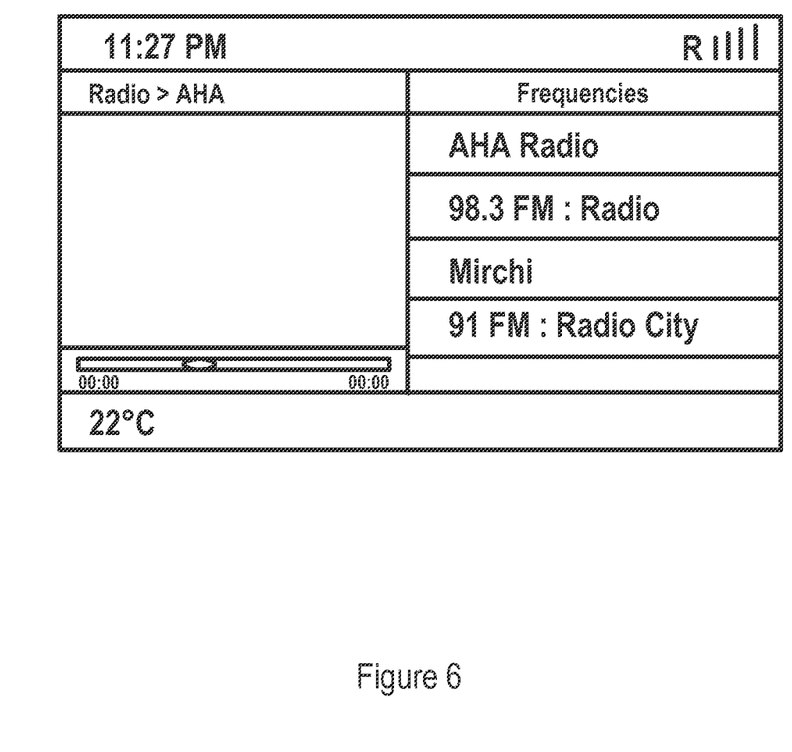
FIG. 6 illustrates the display of FIG. 3, where the display may represent an application home screen example, such as a home screen of a media player, which one or more aspects of the GS may activate subsequent to a user selecting a respective icon and/or widget operable to initiate execution of the media player.

FIG. 6 illustrates an example screen of the display of FIG. 3, where the display may represent an application home screen, such as a home screen of a media player, which one or more aspects of the GS may activate subsequent to a user selecting a respective icon and/or widget operable to initiate execution of the media player. The home screen of a media player may include a list of frequently selected audio/visual media channels and/or programs. Channels may include radio or television stations, stations for a particular artist or genre of media, and/or the like. Programs may include a particular audio/visual file, such as a song, speech, album, movie, television show, and/or the like. Analogous to the "contacts" application, an aspect of the GS may store a user's interaction with the media player. Also, as it can be imagined, the GS may store a user's interaction with any application, operation, or electronic media obtainable via an electronic device, such as the electronic device 100.

Similarly, depending on user settings, whether default settings or configured by the user, a shortcut icon for selecting a media channel or program may be enlarged on the system home screen or the respective application home screen due to the media channel or program being the most frequently used channel or program. Also, an icon representing a shortcut to a media channel or program may increase and/or decrease in size with respect to frequency, duration, and/or recentness in which the user uses the media channel or program, relative to the frequency, duration, and/or recentness in which the user uses other media channels or programs. Also, in general, any widget, menu, and/or icon of any application, operation, and/or electronic media may increase or decrease in size with respect to frequency, duration, and/or recentness in which the user uses the application, operation, and/or electronic media, relative to the frequency, duration, and/or recentness in which the user uses other applications, operations, and/or electronic media. These functions may also occur according to a routine of the user and/or a routine of a person associated with the user.

Figure 7:
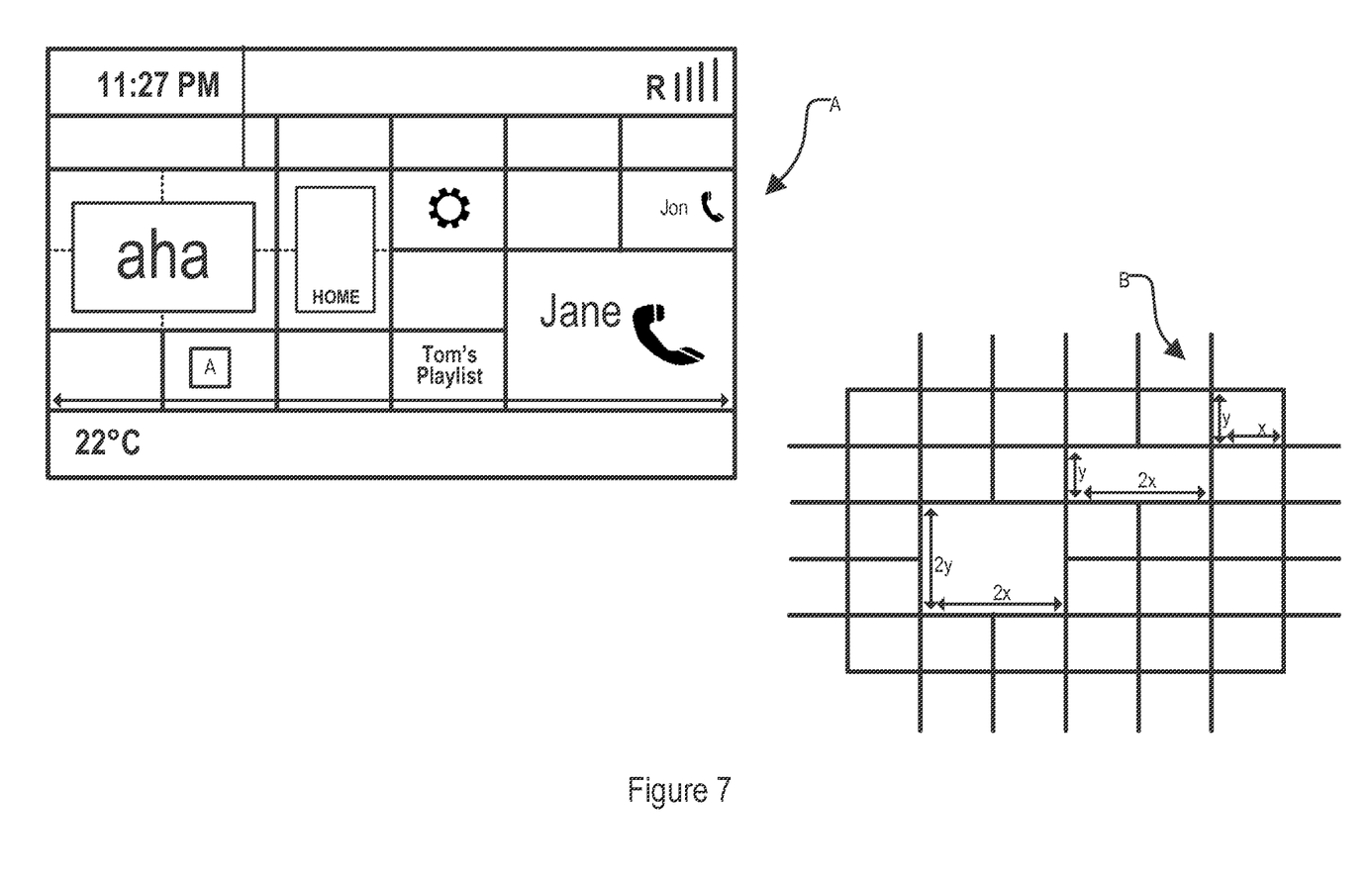
FIG. 7 illustrates the display of FIG. 3, where the display may represent a system home screen example subsequent to a user interacting with the system home screen and/or one or more applications, such as the "contacts" application and media player. Also, depicted to the right of the system home screen example is an illustration of example growth of areas for containing an example icon and/or widget.

FIG. 7 illustrates another example screen of the display of FIG. 3, where the display may represent a system home screen subsequent to a user interacting with system home screen and/or one or more applications, such as the "contacts" application and the media player. Also, depicted to the right of the system home screen of display A is an illustration of example growth of areas for containing an example icon and/or widget (see display B).

In FIG. 7, an example shortcut icon to "aha" radio has been enlarged which may be due to being used by the user more often and/or recently than other stations or programs of the media player. Also, a shortcut icon for contacting "Jane" has been enlarged which may be due to "Jane" being a relatively more frequent and/or recent contacted contact of the user. "Jane" may also be the most frequent and/or recent contacted contact. Also depicted is the enlargement of the "aha" and "Jane" shortcut icons causing other icons to shift horizontally and/or vertically to another location, or to be removed in some cases. In one example of the GS, a widget, a menu, and/or an icon can increase and/or decrease by two-fold and/or four-fold, where for example the minimum cells occupied is one cell, and the maximum cells occupied is four cells (see display B for clarification).

The direction and/or amount of increasing and/or decreasing size of a widget, a menu, and/or an icon may be configurable by the user and/or the GS. The GS may configure the direction and/or amount of increasing and/or decreasing size of a widget, a menu, and/or an icon based on at least partially programmed criteria.

Additionally or alternatively, a display, such as the display of FIGS. 3-7, may be embedded in a head unit. Resizing and rearrangement of widgets, menus, and/or icons may be particularly useful in a GUI of a head unit of a vehicle. A driver or passenger may find it easier to accurately view or interact with larger icons to make a phone call, get directions, adjust heating and cooling, and/or operate a radio or media player. Also, shortcut icons may be configured to operate frequent tasks in a vehicle, such as calling a regular contact, adjusting heating/cooling to a particular setting, and/or tuning to a favorite radio station. Also, shortcut icons may be programmed to perform conditional operations. For example, a shortcut icon could be programmed to vary the heating/cooling depending on the outdoor temperature, season, date, time of the day, number of passengers in the vehicle, and any combination thereof. Also, a shortcut may be programmed to play or tune to a programming schedule. For example, news in the morning and a lite FM channel in the afternoon. Also directions to and from particular locations, which may include traffic patterns, may be based on time and day of the week and/or information from a traffic information service. For example, by merely selecting, such as by pressing, a respective enlarged shortcut icon, a driver may receive traffic patterns for his or her regular commute.

In short, there are boundless applications of the GS, including applications well beyond use of the GS with a head unit of a vehicle. As mentioned, the GS can be applied to any other type of electronic device, including any device with a GUI. Besides automotive electronics, for example, the GS can apply to GUIs of any electronic device, including a GUI of a desktop or laptop computer, a hand-held device such as a smartphone or a tablet computer, a portable media player or gaming device, a household appliance such as a washer or a dryer, office equipment such as a photocopier, and set-top box such as a cable television receiver or digital recorder.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method, comprising:
receiving, at a processor, user input information, where the user input information includes data regarding one or more of a frequency of an action of a user, a frequency of use of an application by the user, and a frequency of use of electronic media by the user;
storing the user input information at a storage device, where the stored user input information further includes routine data regarding one or more routines of the user and frequency data regarding one of more of the frequency of the action of the user, the frequency of use of the application by the user, and the frequency of use of the electronic media by the user;
changing, by the processor, configuration information of a graphical element associated with the action, the application, or the electronic media, where the graphical element resides in one or more selectable cells of a plurality of cells defining a graphical user interface, and where changing of the configuration information is based at least partially on the stored user input information and includes selectively expanding the graphical element into one or more adjacent cells of the one or more selectable cells, where a size of the graphical element is a number of cells of the graphical user interface that the graphical element occupies, instructions executable to calculate the number of cells based on a weight function in which each of duration data, the frequency data, and the routine data is multiplied by a respective weight; and
transmitting, by the processor, the graphical element and the configuration information to display.

2. The method of claim 1, where the graphical element includes one or more of a shortcut icon, an executable icon, or a widget.

3. The method of claim 1, where the user input information includes data regarding an average duration of the action, an average duration of use of the application, or an average duration of use of the electronic media and where the changing of the configuration information is based on the weight function in which weights are applied to the data included in the user input information.

4. The method of claim 1, where the user input information includes data regarding recentness of the action, use of the application, or use of the electronic media.

5. The method of claim 1, where the user input information includes data regarding a routine of the user, the routine being associated with the action, the application, or the electronic media.

6. The method of claim 1, where the graphical element is a selected graphical element of a plurality of graphical elements in the graphical user interface, the method further comprising shifting one or more other graphical elements of the plurality of graphical elements horizontally and/or vertically to another location responsive to expanding the selected graphical element into one or more adjacent cells of the one or more selectable cells.

7. The method of claim 1, where the graphical element is a selected graphical element of a plurality of graphical elements in the graphical user interface and is adjusted to substantially fill one or more cells of an area of predefined coordinates according to the stored user input information, and the method further comprising removing one or more other graphical elements of the plurality of graphical elements responsive to expanding the selected graphical element into one or more adjacent cells of the one or more selectable cells.

8. A system, comprising:
   a processor and a memory device that includes:
      instructions executable to receive and store user input of a user;
      instructions executable to change a size of a graphical element associated with an action, an application, or electronic media, based at least partially on the stored user input, where the stored user input includes routine data, frequency data, and duration data, the duration data including data regarding one or more of a duration of the action, a duration of use of the application, and a duration of use of the electronic media, where the graphical element resides in one or more selectable cells of a plurality of cells defining a graphical user interface, and where the size of the graphical element is a number of cells of the graphical user interface that the graphical element occupies, the instructions being executable to calculate the number of cells based on a weight function in which each of the duration data, the frequency data, and the routine data is multiplied by a respective weight; and
   instructions executable to transmit the graphical element for display on a user interface.

9. The system of claim 8, wherein the user interface includes a touchscreen.

10. The system of claim 8, where the graphical element includes one or more of a shortcut icon, an executable icon, or a widget.

11. The system of claim 8, comprising a head unit, where the head unit includes the user interface.

12. The system of claim 8, where the routine data includes data regarding one or more routines of the user and the frequency data includes data regarding one of more of a frequency of the action, a frequency of use of the application by the user, and a frequency of use of the electronic media by the user.

13. The system of claim 8, where each of the plurality of cells is a square, a rectangle, a diamond, a triangle, or a circle.

14. The system of claim 8, where the memory device includes instructions executable to adjust the graphical element to substantially fill the one or more selectable cells of a predefined area of coordinates.

15. An electronic device, comprising:
   a user input device operable to receive user input from a user;
   a processor and a memory device that includes:
      instructions executable to store the user input; and
      instructions executable to adjust a graphical element associated with an action, an application, or electronic media, based at least partially on the stored user input, where the stored user input includes data regarding one or more routines of the user and frequency data regarding one of more of a frequency of the action, a frequency of use of the application by the user, and a frequency of use of the electronic media by the user, where the graphical element resides in one or more selectable cells of a plurality of cells defining a graphical user interface, and where adjusting the graphical element includes changing a number of selectable cells in which the graphical element resides, the number of selectable cells being calculated based on a weight function including a weight applied to the data of the stored user input in which each of duration data, the frequency data, and routine data is multiplied by a respective weight; and
   a display device operable to display the graphical element on a screen.

16. The electronic device of claim 15, wherein the user input device and display device include a touchscreen, and the received user input includes one or more touches to the touchscreen.

17. The electronic device of claim 15, where the graphical element includes one or more of a shortcut icon, an executable icon, or a widget.

18. The electronic device of claim 15, where adjusting the graphical element includes selectively increasing the number of selectable cells in which the graphical element resides and expanding the graphical element to reside in one or more cells adjacent to the one or more selectable cells.

19. The electronic device of claim 15, where each of the plurality of cells is a square, a rectangle, a diamond, a triangle, or a circle.

20. The electronic device of claim 15, where the memory device includes instructions executable to adjust the graphical element to substantially fill the one or more selectable cells of a predefined area of coordinates of the screen.

* * * * *